(No Model.)
C. A. LORETZ.
CONNECTING THE WASTE PIPES OF BUILDINGS WITH SEWERS.
No. 262,801. Patented Aug. 15, 1882.
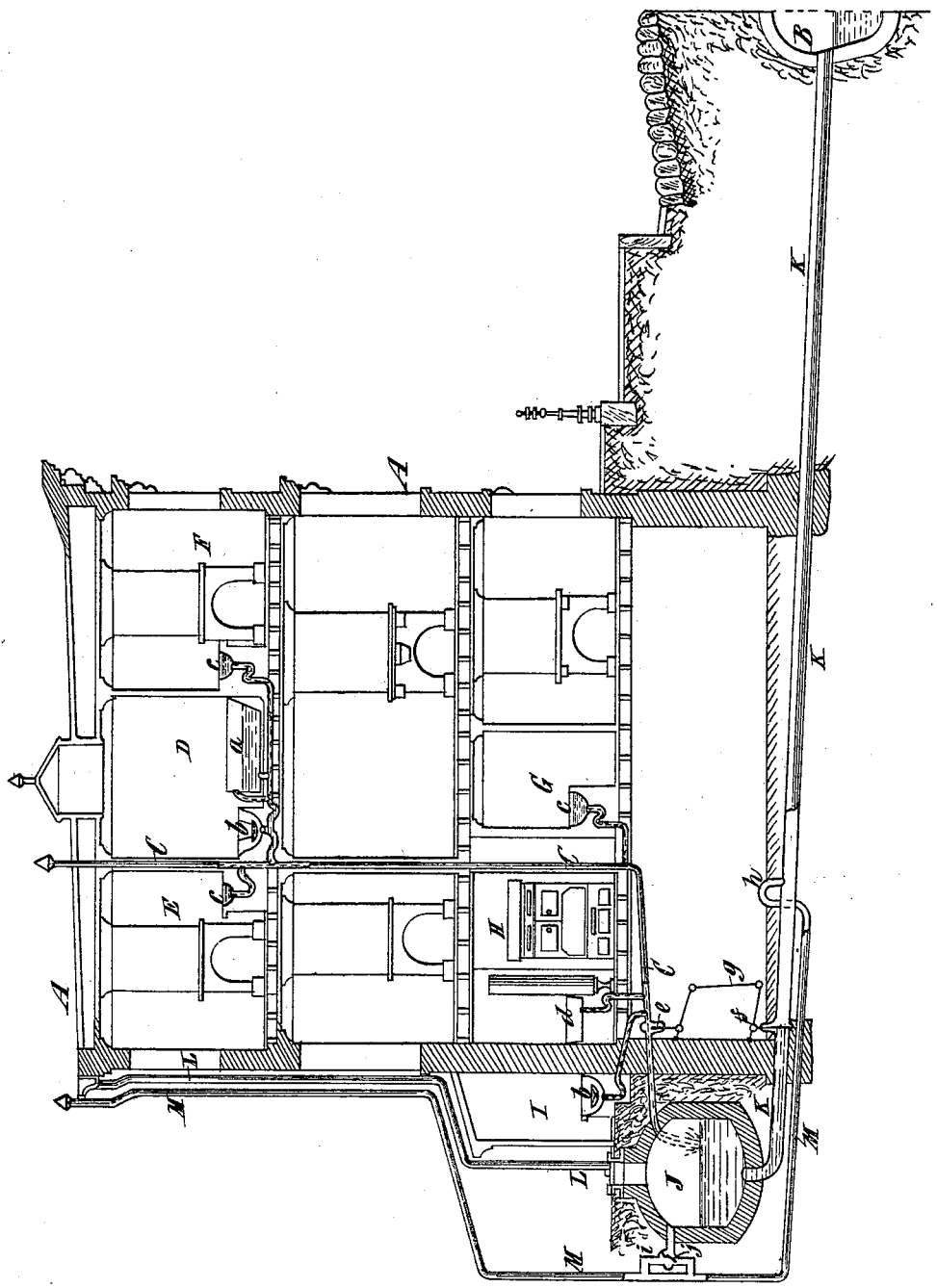

UNITED STATES PATENT OFFICE.

CHARLES A. LORETZ, OF BROOKLYN, NEW YORK.

CONNECTING THE WASTE-PIPES OF BUILDINGS WITH SEWERS.

SPECIFICATION forming part of Letters Patent No. 262,801, dated August 15, 1882.

Application filed April 14, 1882. (No model.)

*To all whom it may concern:*

Be it known that I, CHARLES ALBERT LORETZ, of Brooklyn, in the county of Kings and State of New York, have invented certain new and useful Improvements in Connecting the Soil or Waste Pipes of Buildings with Sewers, of which the following is a specification.

The object of my invention is to enable the soil or waste pipes of buildings to be so connected with the sewers that gases generated in or emanating from the sewers shall be more effectively prevented from passing upward into the buildings.

The invention consists essentially in the combination, with the soil or waste pipe of a dwelling-house or other building, and with a sewer, of an interposed receiving-chamber with which said soil or waste pipe is connected, a drain-pipe or conduit connecting said receiving-chamber with the sewer, and valves in said soil or waste pipe and said drain-pipe or conduit, whereby provision is afforded for closing the communication between the soil or waste pipe and the chamber when the latter is in communication with the sewer, and for closing the communication between said chamber and the sewer when the soil or waste pipe is open. This receiving-chamber receives the waste water and sewage from the house or building from time to time, and may be made to discharge its contents periodically into the sewer.

The invention also consists in the combination, with the above-described soil or waste pipe and the drain-pipe or conduit, of valves or gates therein, one of which is to be opened when the other is closed, and which are connected so that they may be operated simultaneously.

The invention also consists in the combination, with the receiving-chamber above-described, of an overflow-pipe which leads therefrom and is connected with the waste drain or conduit, so that the receiving-chamber cannot become too full, even if the discharging of its contents is neglected, and said overflow-pipe is continued or extended upward above the said chamber, and is provided with an automatically-opening valve to prevent any gases from passing through it into the receiving-chamber.

The accompanying drawing represents a vertical section of a dwelling-house with a portion of the sewer, the soil or waste pipe of the house being connected with the sewer according to my invention.

A designates the house, and B designates the street-sewer with which the house is connected.

C designates the main soil or waste pipe, extending through the house, and, as here represented, prolonged above the roof and ventilated.

On the upper floor of the house I have represented a bath-tub, *a*, and closet *b* in the bath-room D, both of which are connected with the soil or waste pipe C. In the rooms E F, I have also represented two basins, *c*, which are likewise connected with the soil or waste pipe C.

In the room G, I have represented a basin, *c*, in the kitchen H a sink, *d*, and in the room I a closet, *b*, all of which are connected with the soil or waste pipe C. The several basins, closets, &c., which discharge into the soil-pipe C may all be provided with ordinary traps, as clearly represented.

In or in the immediate vicinity of the house is a receiving-chamber, J, which may be constructed of masonry or in any other suitable way, and which is here represented as sunk below the level of the ground in rear of the house. The soil-pipe C leads directly to the receiving-chamber J, and from said chamber a main drain-pipe or conduit, K, leads to the sewer B. The passage through the soil-pipe C is controlled by a valve, *e*, of any suitable construction, and in the drain or conduit K is a similar valve, *f*. The handles of these valves, or the levers whereby they are operated, may be connected together by a rod, *g*, so that they may be always operated together, one being open while the other is closed, and vice versa. The soil-pipe C is to discharge its contents into the chamber J from time to time, and at any desired intervals the accumulation of matter in the chamber J is to be discharged into the sewer. Normally the valve *e* is open, and the valve *f* is then closed, as clearly shown, so that no gas can escape from the sewer into the chamber J; but when it is desired to empty the chamber J the valve *e* is closed and the valve *f* is opened.

From the above it will be clearly understood that the soil-pipe C is never open to the sewer, as one or the other of the valves e f is always closed, and, although the soil-pipe C is open to the receiving-chamber J during the principal portion of the time, no appreciable quantity of gas will escape, as the sewage is not allowed to stand in the chamber long enough to generate gas.

From the chamber J a pipe, L, may lead upward to the roof, and said pipe serves both as a ventilator and as a conductor for conveying rain-water from the roof to the chamber J.

The chamber J may be discharged each day or at longer intervals, and in case it should be neglected I provide an overflow-pipe, M, leading therefrom to the main drain or conduit K and connected therewith by a trap, h, as clearly shown. The pipe M is not connected directly with the chamber J, but through a branch pipe, i, in which is an outwardly-opening valve, j, and hence any gas which passes the trap h and enters the pipe M cannot enter the chamber J, but passes upward through the pipe M above the roof, and is there discharged to the atmosphere.

It will be seen that at no time is the soil or waste pipe C in direct communication with the sewer B, and by my invention I provide for effectually keeping sewer-gas from houses or other buildings and prevent sicknesses, which frequently result from the presence of sewer-gas in buildings.

In practice the overflow-pipe M should be elevated above the drain or conduit K, so that sewage will not remain therein; but it is here represented as below the drain or conduit for the sake of clear illustration.

What I claim as my invention, and desire to secure by Letters Patent, is—

1. The combination, with the soil or waste pipe of a building, and with a sewer, of a receiving-chamber with which said soil or waste pipe connects, a drain-pipe or conduit connecting said receiving-chamber with the sewer, and valves in said soil or waste pipe and said drain-pipe or conduit, whereby provision is afforded for closing the communication between the soil or waste pipe and said chamber when the latter is in communication with the sewer and for closing the communication between said chamber and the sewer when the soil or waste pipe is open, substantially as and for the purpose herein described.

2. The combination, with the soil or waste pipe of a building, and with a sewer, of a receiving-chamber with which said soil or waste pipe connects, and a drain or conduit connecting said receiving-chamber and sewer, and valves or gates in said soil or waste pipe, and said drain or conduit connected so as to be operated simultaneously, substantially as herein described.

3. The combination, with the soil-pipe C and drain or conduit K, of the receiving-chamber J, provided with the overflow-valve j, and the overflow-pipe M, extending above said chamber and open to the atmosphere, substantially as herein described.

CH. ALBERT LORETZ.

Witnesses:
FREDK. HAYNES,
ED. MORAN.